Sept. 12, 1939.    L. WERTHEIMER    2,173,007
BEVERAGE DISPENSER
Filed May 12, 1937    2 Sheets-Sheet 1

Inventor
LEO WERTHEIMER
by J.W.M. Ellis
Attorney

Sept. 12, 1939.　　　　L. WERTHEIMER　　　　2,173,007
BEVERAGE DISPENSER
Filed May 12, 1937　　　　2 Sheets-Sheet 2
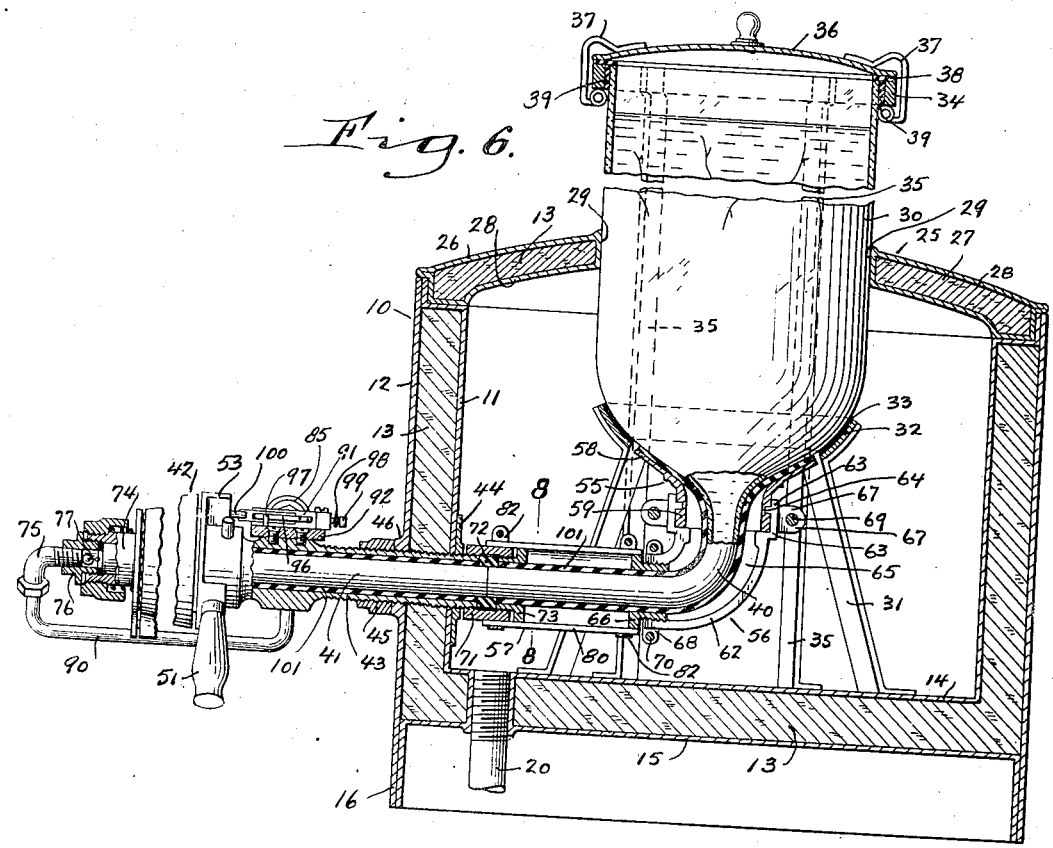

Patented Sept. 12, 1939

2,173,007

UNITED STATES PATENT OFFICE 2,173,007

BEVERAGE DISPENSER

Leo Wertheimer, Buffalo, N. Y., assignor to Amcoin Corporation, Buffalo, N. Y., a corporation of New York Application May 12, 1937, Serial No. 142,182

9 Claims. (Cl. 225—21)

My invention relates in general to a device for dispensing beverages, and particularly to such a device in which such beverages may be kept cool and in which they may be agitated and aerated.

It is well known to those skilled in the art that the juices of certain fruits and vegetables, as well as butter fats, contain certain acids which make it necessary to keep them in glass or earthenware containers and out of contact with metal parts. It is also necessary, in beverage dispensing devices, to keep such beverages cool. It is, furthermore, well known that when most beverages are kept in a container ready for dispensing, precipitation occurs in the container and such beverages cannot, therefore, be served in this condition.

The principal object of my invention has been to provide a container for beverages in which substantially all of the surfaces exposed thereto will be of glass.

Another object of my invention has been to provide such an apparatus with means for agitating the beverage each time a quantity thereof is withdrawn from the container, whereby all of the elements of the beverages are equally distributed through the mass.

Another object has been to provide an apparatus which may be convenient to use and one in which the customer can see the beverage contained in the apparatus before it is dispensed.

Moreover, my device provides for cooling the beverage so that it may be preserved as well as made more palatable.

Furthermore, the fluid used for agitating the beverage may be of such a nature that the beverage will also be aerated.

The above objects and advantages have been accomplished by the device shown in the accompanying drawings, of which:

Fig. 6 is an enlarged, fragmentary, sectional elevation taken through the vertical center line of the device.

Fig. 7 comprises a perspective view of a protective elbow as well as a perspective view of a protective flange.

Fig. 8 is a sectional view taken on line 8—8 of Fig. 6, showing a protective sleeve.

Figure 1:
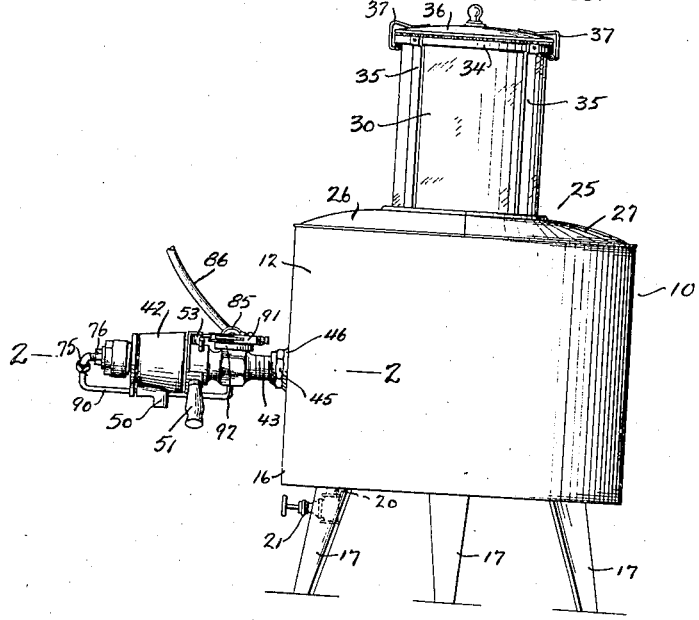
Fig. 1 is an exterior view of my device.

My device comprises a cooling chamber 10 having interspaced inner and outer walls 11 and 12, respectively. Suitable insulating material 13 is placed between the walls. The bottom of the cooling chamber is also formed with two interspaced walls 14 and 15 also having suitable insulating material 13 therebetween. As shown in Fig. 6, the outer wall 12 is extended down below the bottom wall 15 so as to form a downwardly extending skirt 16 for supporting the device upon a counter or other surface. Where desired, as shown in Fig. 1, legs 17 may be provided for raising the chamber above the supporting surface. A suitable drain 20 is provided in the bottom and extends to the top wall 14 of the bottom, whereby the chamber may be drained, when desired, of any accumulated liquid. A valve 21, shown in Fig. 1, is placed in the pipe 20, and the pipe 20 may be extended to any suitable drain. Any suitable medium or form of refrigeration may be employed for cooling the chamber 10 as, for instance, crushed ice and salt.

A suitable cover 25 is provided for the cooling chamber which is preferably made in two parts 26 and 27, each part having interspaced walls 28 between which suitable insulating material 13 is placed. The cover parts are, together, formed with a central annular opening 29 which closely engages the beverage container 30. The beverage container 30 is of glass and preferably cylindrical in form. It is preferably disposed coaxially with and partly within the cooling chamber 10 and is held in position by means of supporting legs 31 which are attached to the inner bottom 14 and at their upper ends to a supporting ring 32. Between the ring and the glass container there is preferably placed a resilient gasket 33. The beverage container is of such length that it may extend a considerable distance above the cover 25 of the cooling chamber, so that the beverage contained therein is visible.

Around the outside of the upper end of the beverage container 30 there is provided a metallic ring 34, and between the ring and the container there is disposed a resilient ring gasket 39. The ring 34 is supported by means of a plurality of struts 35 which rest upon and are secured to the inner wall 14 of the bottom of the chamber and which have their upper ends secured to the ring by any suitable means. A cover 36 is provided for the container, and this cover is held in place by means of spring clips 37 of any desired form. A gasket 38 may be provided between the cover and the ring 34, so that the upper end of the container is made fluid-tight and air-tight.

The container 30 is provided at its lower end with a glass outlet pipe 40 which is preferably integral with the container and arranged at right angles thereto. It is of such a length that it extends toward but preferably not to the inner wall 11 of the cooler. In registration with this outlet pipe is the glass liner tube 41 of the dispensing valve 42. This dispensing valve is provided with a screwthreaded hollow shank 43 which is passed through the walls 12 and 11 of the cooling chamber and through a screwthreaded flange 44 located on the inside of the inner wall. A lock nut 45 is preferably arranged upon the shank for engagement with a boss 46 formed on the outer wall 12 of the chamber. Dispensing valves of this type are well known in the art. In my invention, this valve is provided with a glass lining tube 41 which extends to the outer end of the valve and beyond the dispensing nozzle 50 thereof, and this tube is formed with an opening communicating with the dispensing nozzle of the valve. This valve is provided with the usual operating handle 51 which controls the movable sleeve 53 of the valve.

Arranged below the container and around the outlet pipe thereof is a protective ring 55, a protective elbow 56, and a protective sleeve 57. The protective ring is of annular form having a flaring flange 58 which fits the bottom of the container 30. The ring is provided with a downwardly extending neck 59 which has an annular groove 60 formed therein. This ring is made in one piece since it may be slipped over the outlet pipe in the process of assembling before the container is placed in position. Arranged below and about the protective ring 55 is the protective elbow 56. This elbow is made in two parts 61 and 62, each having a flange portion 63, which carries substantially one-half of an annular and inwardly extending flange 64 that engages with the annular recess 60 of the protective ring. The body portions 65 of the protective elbow 56 are of angular shape and are provided in their outer ends with interior screwthreads, as shown in Fig. 6, with which a screwthreaded flange 66 is engageable. The two halves of the protective elbow are provided with lugs 67 and 68 through which bolts 69 and 70, respectively, are passed, and whereby the parts are securely held together and clamped to the protective ring and flange 66. The inner end of the threaded shank 43 of the dispensing valve preferably extends into the cooling chamber slightly beyond the threaded flange 44, and onto this portion of the stem is screwthreaded a coupling 71. This coupling is interiorly screwthreaded throughout its length, and the outlet pipe 40 of the container and glass liner 41 of the valve are so proportioned that the joint between them comes substantially midway the length of the coupler. The two glass pipes are placed in contact with each other and the joint between them is preferably ground. Around and over the joint between the two glass pipes is arranged a packing washer 72 which is forced in place and expanded within the coupler 71 and around the joined ends of the glass tubes by means of a gland 73 which is screwthreaded into the free end of the coupler. The flange diameter of the gland 73, the outside diameter of the coupler 71, and the larger diameter of the flange 66 are substantially the same and the protective tube 57 is arranged to engage these surfaces. This tube is preferably made in two parts 80 and 81 so that it may be conveniently assembled and these two parts of the tube are clamped together and held in position by means of clamps 82, one arranged preferably at each end of the tube.

In order to maintain a uniform distribution of the elements of the beverage, and to agitate the same each time a portion is drawn from the container, I contemplate the use of some compressed fluid, such as compressed air, or any pure and harmless gas.

In order that the beverage may be properly agitated, a small charge of such compressed fluid must be allowed to enter the container just previous to the dispensing of the beverage, and it is preferable that such charge be controlled by the actuation of the beverage dispensing valve. In order to accomplish this sequential operation, I provide a fluid valve 85 which is supplied with the fluid coming from a suitable source as contained, for instance, in convenient drums (not shown) through preferably a flexible hose 86. This valve is of the spring-pressed type and is well known in the art. It is provided with a spring-pressed plunger 87 which is normally held upon its seat and depressed when the valve is to be opened. This valve is provided with an outlet boss 88 which is secured by suitable means to a bracket 89 secured preferably to a stationary portion of the dispensing valve 42. The outlet boss 88 of the valve is connected to the outer end 74 of the dispensing valve 42 by means of a pipe or tube 90, which is provided with a connecting elbow 75 screwed into a coupling 76, whereby when the plunger 87 of the valve is depressed, the fluid passing through the valve will be conducted to the extreme outer end of the beverage passageway. Provided, preferably in the coupling 76, is a check valve 77, whereby the beverage in the dispensing valve will be prevented from entering and filling the pipe 90.

Arranged in cooperative relation with the plunger 87 is an operating lever 91. This lever is pivotally carried by a block 92 which is secured to a fixed part of the dispensing valve. This lever is located adjacent to the plunger 87 so that clockwise movement thereof, as viewed in Fig. 2, will engage the plunger and cause it to be depressed. At the outer end of the operating lever is provided a pivotally mounted latch 93 which is pivoted at 94. The inner end 95 of this latch is so formed that it cannot move in a clockwise direction with the operating lever, as viewed in Fig. 4, but will be held in straightline position, as shown in this figure, when movement of the lever is in a clockwise direction. This latch is permitted, however, to rotate upon its pivot 94 in counterclockwise direction, as viewed in Fig. 4, against the tension of a spring 96. This spring serves to retain the latch in the position shown in Fig. 4. The operating lever 91 is prevented from counterclockwise movement beyond the point shown in Fig. 2 by means of a stop 97 carried by the block 92, and this lever is held normally in this position by means of a helical spring 98, having one of its ends attached to the bracket 89 and its other end to a stud 99 carried by the lever.

Figure 2:
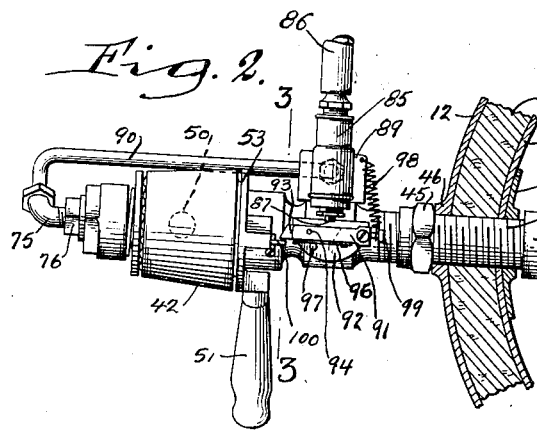
Fig. 2 is an enlarged, sectional, plan view taken on line 2—2 of Fig. 1.
Figure 3:
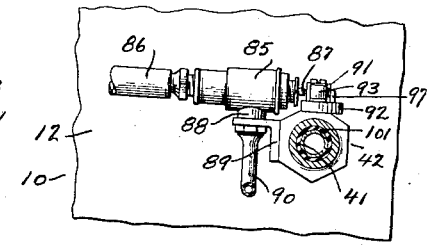
Fig. 3 is an enlarged, fragmentary, sectional elevation of the device, taken on line 3—3 of Fig. 2, showing the liquid valve.
Figure 5:
Fig. 5 is an enlarged elevation of the operating lever.

In order to bring about the sequential operation of the fluid valve 85, I provide a lug 100 on the rotating sleeve 53 of the dispensing valve, so that each time the dispensing valve is operated, this lug will engage the outer end of the latch 93 carried by the operating lever 91 and cause this lever to be swung upon its pivot in clockwise direction, as viewed in Fig. 2, and to push the plunger 87 of the fluid valve inwardly. The parts are so designed and arranged that the lug 100 will move away from the end of the latch 93 allowing it to return to its normal inoperative position just before the dispensing valve is opened. The fluid valve will, therefore, be given but momentary operation, whereby a predetermined charge of the fluid under pressure will be permitted to pass through pipe 90, elbow 75, and coupling 76, to the extreme end of the liner tube of the dispensing valve, thereby agitating and equally distributing the elements of the beverage contained, not only in the outlet and dispensing tubes 40 and 41, respectively, but also that in the container 30.

Figure 4:
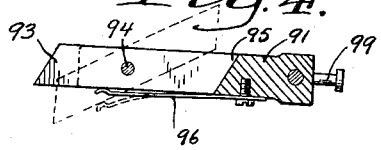
Fig. 4 is an enlarged, fragmentary, plan view of the operating lever for the liquid valve, and is taken on line 4—4 of Fig. 5.

When the dispensing valve is closed, the lug 100 will engage with the angular face at the end of the latch 93 and cause it to be rotated in counterclockwise direction, as viewed in Fig. 4, and against the tension of the spring 96 (see dotted line position of Fig. 4), thereby allowing the lug 100 to pass to the other side of the operating lever and to be in position to again operate this lever when beverage is again to be dispensed in the manner above described.

As shown in the drawings, the outlet pipe 40 of the container and the glass liner 41 of the dispensing valve are protected by a rubber covering 101 which is preferably in the form of rubber tuping.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A beverage dispenser comprising a beverage container, an outlet pipe connected to said container and providing free passage from the container to the outer end of said outlet pipe, valve-controlled means for connecting a source of fluid under pressure to substantially the extreme outer end of the outlet pipe, a dispensing valve disposed in said outlet pipe and located between the container and the outer end of said outlet pipe, and means connecting the dispensing valve to the fluid valve for opening the fluid valve each time the dispensing valve is opened but previous to the opening of said dispensing valve.

2. A beverage dispenser comprising a beverage container, an outlet pipe connected to said container and providing free passage from the container to the end of said outlet pipe, a dispensing valve disposed in said outlet pipe and located between the container and the outer end of said outlet pipe, a fluid pipe connecting a source of fluid under pressure to substantially the extreme outer end of the outlet pipe, a fluid valve located in said fluid pipe, and means carried by said dispensing valve for momentarily opening said fluid valve prior to and whenever said dispensing valve is opened, whereby the beverage contained in the outlet pipe and the container is agitated before the beverage is dispensed.

3. A beverage dispenser comprising a beverage container, an outlet pipe connected to said container and providing free passage from the container to the end of said outlet pipe, a dispensing valve disposed in said outlet pipe and located between the container and the outer end of said outlet pipe, a fluid pipe connecting a source of fluid under pressure to substantially the extreme outer end of the outlet pipe, a fluid valve located in said fluid pipe and having a spring-pressed plunger, and means carried by said dispensing valve for momentarily opening said fluid valve prior to and whenever said dispensing valve is opened, comprising an operating lever engageable with the plunger of the fluid valve, and means carried by the dispensing valve for operating the lever, whereby the beverage contained in the outlet pipe and the container is agitated before the beverage is dispensed.

4. A beverage dispenser comprising a beverage container, an outlet pipe connected to said container and providing free passage from the container to the end of said outlet pipe, a dispensing valve disposed in said outlet pipe and located between the container and the outer end of said outlet pipe, a fluid pipe connecting a source of fluid under pressure to substantially the extreme outer end of the outlet pipe, a fluid valve located in said fluid pipe and having a spring-pressed plunger, and means carried by said dispensing valve for momentarily opening said fluid valve prior to and whenever said dispensing valve is opened, comprising an operating lever engageable with the plunger of the fluid valve and having a pivotally mounted latch, and means carried by the dispensing valve and engageable with the latch for operating said lever, whereby the beverage contained in the outlet pipe and the container is agitated before the beverage is dispensed.

5. A beverage dispenser comprising a beverage container, an outlet pipe connected to said container and providing free passage from the container to the end of said outlet pipe, a dispensing valve disposed in said outlet pipe and located between the container and the outer end of said outlet pipe, a fluid pipe connecting a source of fluid under pressure to substantially the extreme outer end of the outlet pipe, a check valve in the fluid pipe and located at the end which connects to the outer end of the outlet pipe, a fluid valve located in said fluid pipe, and means carried by said dispensing valve for momentarily opening said fluid valve prior to and whenever said dispensing valve is opened, whereby the beverage contained in the outlet pipe and the container is agitated before the beverage is dispensed.

6. A beverage dispenser comprising a beverage container, an outlet pipe connected to said container and providing free passage from the container to the end of said outlet pipe, a dispensing valve disposed in said outlet pipe and located between the container and the outer end of said outlet pipe, a fluid pipe connecting a source of fluid under pressure to substantially the extreme outer end of the outlet pipe, a fluid valve located in said fluid pipe, and trigger means carried by said dispensing valve for momentarily opening said fluid valve prior to and whenever said dispensing valve is opened, whereby the beverage contained in the outlet pipe and the container is agitated before the beverage is dispensed.

7. A beverage dispenser comprising a beverage container, outlet means, a dispensing valve in the outlet means for controlling the dispensing of the beverage, and means for directing a counter-flow of agitating fluid through said dispensing valve and outlet means back into the container, whereby substantially all of the beverage is agitated.

8. A beverage dispenser comprising a beverage container, outlet means, a dispensing valve in the outlet means for controlling the dispensing of the beverage, and means operable by and during a portion of the manipulation of the dispensing valve for directing a counterflow of agitating fluid through said dispensing valve and outlet means back into the container, whereby substantially all of the beverage is agitated.

9. A beverage dispenser comprising a beverage container, a delivery nozzle therefor, agitating fluid supply means, and common means for successively connecting the container to the agitating fluid supply means and to said nozzle, whereby a counterflow of agitating fluid to the container is effected preliminarily to the outflow of the beverage.

LEO WERTHEIMER.